(12) United States Patent
Ribeiro Dias et al.

(10) Patent No.: US 6,717,979 B2
(45) Date of Patent: Apr. 6, 2004

(54) METHOD FOR ESTIMATING A DIRECTION OF ARRIVAL

(75) Inventors: Alexandre Ribeiro Dias, Rennes (FR); Loïc Brunel, Rennes (FR)

(73) Assignee: Mitsubishi Electric Information Technology Centre Europe B.V., Rennes (FR)

( * ) Notice: Subject to any disclaimer, the term of this patent is extended or adjusted under 35 U.S.C. 154(b) by 0 days.

(21) Appl. No.: 10/126,543

(22) Filed: Apr. 22, 2002

(65) Prior Publication Data

US 2003/0012262 A1 Jan. 16, 2003

(30) Foreign Application Priority Data

Apr. 27, 2001 (EP) .............................................. 01401120

(51) Int. Cl.$^7$ .............................................. H04B 1/707
(52) U.S. Cl. ...................................................... 375/150
(58) Field of Search ................................ 375/148, 149, 375/150, 142, 143, 144; 370/320, 335, 342, 441; 342/147, 153, 154, 367, 368, 378, 383, 417, 423; 455/562

(56) References Cited

U.S. PATENT DOCUMENTS

| | | | | |
|---|---|---|---|---|
| 5,262,789 A | * | 11/1993 | Silverstein ................... | 342/368 |
| 6,064,338 A | * | 5/2000 | Kobayakawa et al. ...... | 342/378 |
| 6,075,484 A | * | 6/2000 | Daniel et al. ................ | 342/372 |
| 6,141,567 A | | 10/2000 | Youssefmir et al. | |
| 6,215,814 B1 | | 4/2001 | Ylitalo et al. | |
| 6,278,406 B1 | * | 8/2001 | Kuwahara ..................... | 342/417 |
| 6,349,218 B1 | * | 2/2002 | Nakagawa et al. ......... | 455/562 |
| 6,377,213 B1 | * | 4/2002 | Odachi et al. .............. | 342/383 |

OTHER PUBLICATIONS

P. Forster, et al., "Maximum Likelihood Multichannel Estimation Under Reduced Rank Constraint", Proceedings of 1998 IEEE International Conference in Acoustics, Speech and Signal Processing, ICASSP '98, vol. 6, pp. 3317–3320.
Hamid Krim, et al., "Two Decades of Array Signal Processing Research", IEEE Signal Processing Magazine, Jul. 1996, vol. 13, No. 4, pp. 67–94.
Richard Roy, et al., "ESPRIT–Estimation of Signal Parameters Via Rotational Invariance Techniques", IEEE Transactions on Acoustics, Speech and Signal Processing, Jul. 1989, vol. 37, No. 7, pp. 984–995.

* cited by examiner

Primary Examiner—Don N Vo
(74) Attorney, Agent, or Firm—Oblon, Spivack, McClelland, Maier & Neustadt, P.C.

(57) ABSTRACT

A method for estimating a direction of arrival of a signal transmitted by a signal source and received by an antenna array. The method estimates the covariance matrix of the signals received by the antennas of the array and derives therefrom a direction of arrival. The received signals are correlated with a reference signal transmitted by the source prior to being submitted to the covariance matrix estimation.

12 Claims, 4 Drawing Sheets

METHOD FOR ESTIMATING A DIRECTION OF ARRIVAL

BACKGROUND OF THE INVENTION

1. Field of the Invention

The present invention concerns a method for estimating the direction of arrival of a reference signal emitted by a signal source. In particular, the present invention can be used for estimating the direction of arrival of a signal emitted by a mobile terminal.

2. Discussion of the Background

Before reviewing the state of the art in the field of DOA (direction of arrival) estimation, the technique of passive beamforming will be shortly introduced.

Figure 1:
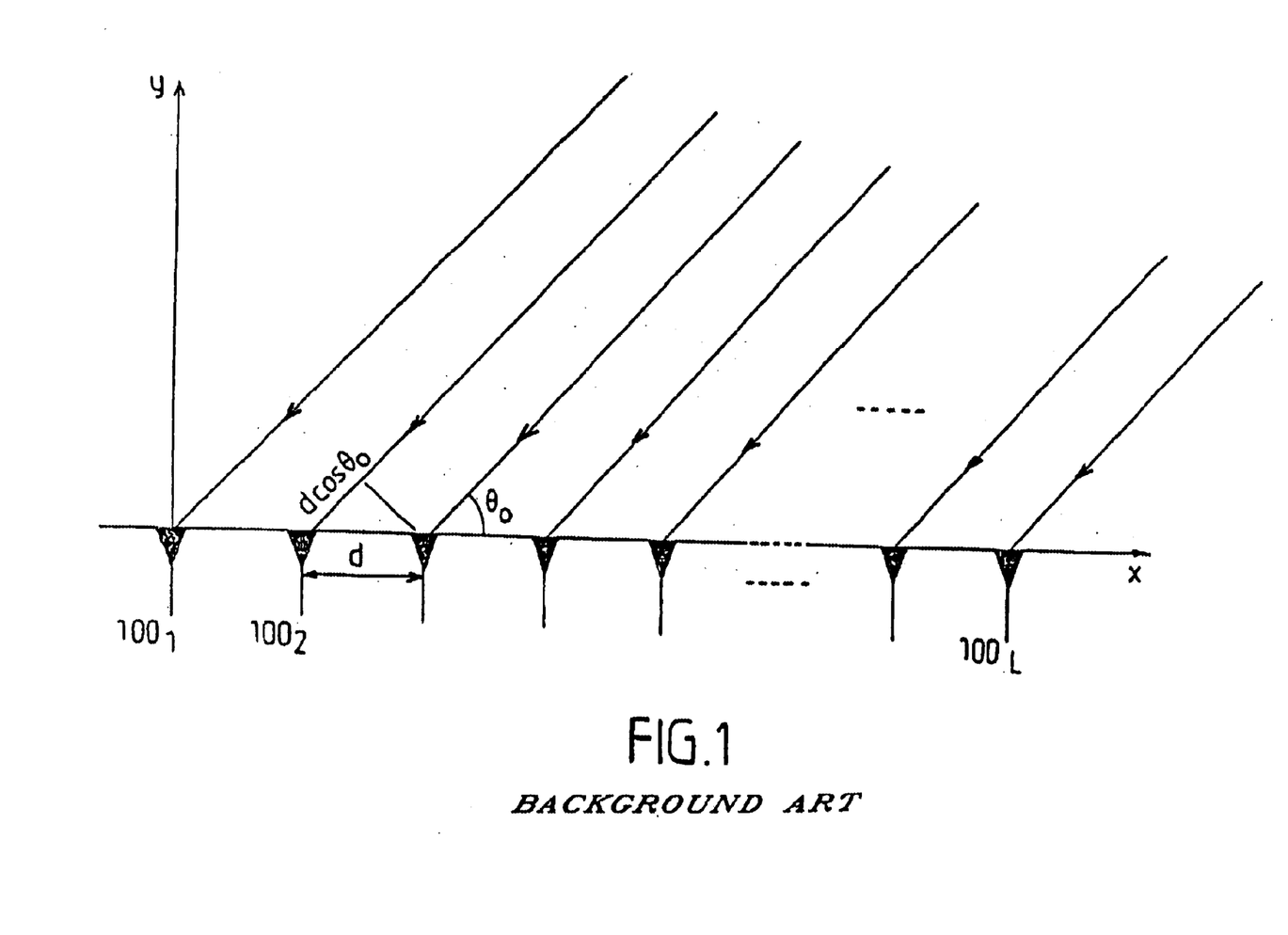
FIG. 1 shows a basic diagram of a uniform linear array used in DOA estimation.

An adaptive antenna generally comprises an antenna array and a beamformer as shown on FIG. 1. The antenna 100 may have an arbitrary geometry and the elementary sensors 100$_1$, . . . , 100$_L$ may be of an arbitrary type. We consider an array of L omnidirectional elements immersed in the far field of a sinusoidal source S of frequency $f_0$. According to the far-field condition we may consider a plane wave arriving from the source in direction $(\Phi_0, \theta_0)$. The first antenna is arbitrarily taken as the time origin. The travelling time difference between the l th element and the origin is given by:

$$\tau_l(\varphi_0, \theta_0) = \frac{<\vec{r_l}, \vec{u}(\varphi_0, \theta_0)>}{c} \tag{1}$$

where $\vec{r}_l$ is the position vector of the l th element, $\vec{u}(\Phi_0,\theta_0)$ is the unit vector in the direction $(\Phi_0,\theta_0)$, c is the speed of propagation, and <, > represents the inner product. For a uniform linear array (ULA) i.e. a linear array of equispaced elements, with element spacing d aligned along the X-axis and the first element located at the origin (1) may be expressed as:

$$\tau_l(\theta_0) = \frac{d}{c}(l-1)\cos\theta_0 \tag{2}$$

The signal received from the first element can be expressed in complex notation as:

$$m(t)\exp(j2\pi f_0 t) \tag{3}$$

where m(t) denotes the complex modulating function.

Assuming that the wavefront on the l th element arrives $\tau_l(\Phi_0,\theta_0)$ later on the first element, the signal received by the l th element can be expressed as:

$$m(t)\exp(j2\pi f_0(t+\tau_l(\Phi_0,\theta_0))) \tag{4}$$

The expression is based upon the narrow-band assumption for array signal processing, which assumes that the bandwidth of the signal is narrow enough and the array dimensions are small enough for the modulating function to stay almost constant over $\tau_l(\Phi_0,\theta_0)$, i.e. the approximation $m(t) \approx m(t+\tau_l(\Phi_0,\theta_0))$ is valid. Then the signal received at the l th element is given by:

$$x_l(t) = m(t)\exp(j2\pi f_0(t+\tau_l(\Phi_0,\theta_0))) + n_l(t) \tag{5}$$

where $n_l(t)$ is a random noise component, which includes background noise and electronic noise generated in the lth channel. The resulting noise is assumed temporally white Gaussian with zero mean and variance equal to $\sigma^2$.

Passive beamforming consists in weighting the signals received by the different elements with complex coefficients $\omega_l$ and summing the weighted signals to form an array output signal. By choosing the complex coeffcients, it is possible to create a receiving pattern exhibiting a maximum gain in the direction $\theta_0$ of the source. The array output signal can be expressed as the product of m(t) and what is commonly referred to as the array factor F:

$$F(\theta) = \sum_{l=1}^{L} \omega_l \exp(j(l-1)\kappa d\cos\theta) \tag{6}$$

where $\kappa = 2\pi/\lambda$ is the magnitude of the so-called wave-vector and $\lambda$ is the wavelength of the emitted signal. If we denote the complex weight $\omega_l = \rho_l \exp(j\phi_l)$, the array factor can be written:

$$F(\theta) = \sum_{l=1}^{L} \rho_l \exp(j(\phi_l + (l-1)\kappa d\cos\theta)) \tag{7}$$

If we choose $\phi_l = -(l-1)\kappa d \cos\theta_0$, the maximum response of $F(\theta)$ will be obtained for angle $\theta_0$, i.e. when the beam is steered towards the wave source.

We suppose now that the array factor is normalized and that $\rho_l = 1/L$. If we consider an arbitrary direction of arrival $\theta$.

$$F(\theta) = \frac{1}{L}\sum_{l=1}^{L} \exp(j\kappa d(l-1)(\cos\theta - \cos\theta_0)) \tag{8}$$

that is, by denoting $\psi = \kappa d(\cos\theta - \cos\theta_0)$:

$$F(\psi) = \frac{1}{L}\frac{\sin(L\psi/2)}{\sin(\psi/2)}\exp(j(L-1)\psi/2) \tag{9}$$

If we denote $w = (\omega_1, \ldots, \omega_L)^T$ the vector of the weighting coefficients used in the beamforming, the output of the beamformer can be simply expressed as $w^H x$. The vector w for steering the beam in the look direction $\theta_0$ is $w = a(\theta_0)$ where $a(\theta_0) = [1, \exp(j \kappa d \cos \theta_0), \ldots, \exp(j(L-1)\kappa d \cos \theta_0)]^T$. If $R_N = \sigma^2 I$ is the covariance matrix of the uncorrelated noise, the power of the noise component at the array output may be written:

$$P_N = w^H R_N w = \frac{\sigma^2}{L} \tag{10}$$

In other words, the noise power at the array output is 2/Lth the noise power present at each element. Thus, beamforming with unity gain in the signal direction has reduced the uncorrelated noise by a factor L and thereby increased the output signal to noise ratio (SNR).

Turning now to a more general case where M point sources are present in the far field, the signal received by an element l can be written:

$$x_l(t) = \sum_{m=1}^{M} s_m(t)\exp(j(l-1)\pi\cos\theta_m) + n_l(t) \tag{11}$$

If we consider the sampled signals at sampling times nT, n={1, ..., N}, denoted n for sake of simplification (11) can be rewritten:

$$x(n) = \sum_{m=1}^{M} a(\theta_m) s_m(n) + n(n) \quad (12)$$

where $a(\theta_m) = [1, \exp(j\pi \cos \theta_m), \ldots, \exp(j(L-1)\pi \cos \theta_m)]^T$ is a vector called the array response, x(n) is the vector of the received signals at time n and $n(n) = [n_1(n), n_2(n), \ldots, n_L(n)]^T$ is the noise vector. The sampled array output x(n) can be expressed as a matrix product:

$$x(n) = As(n) + n(n) \quad (13)$$

where $A = [a(\theta_1), a(\theta_2), \ldots, a(\theta_M)]$ is the L×M matrix the columns of which are the vectors $a(\theta_m)$ and $s(n) = [s_1(n), s_2(n), \ldots, s_M(n)]^T$ is the signal vector.

We suppose that the signals and noise samples are stationary and ergodic complex-valued random processes with zero mean, uncorrelated with the signals and uncorrelated each other. They are modeled by temporally white Gaussian processes and have identical variance $\sigma^2$.

Most of the DOA estimation techniques are based upon the calculation of an estimate of the spatial covariance matrix R:

$$R = E[x(n)x^H(n)] = \lim_{N \to \infty} \frac{1}{N} \sum_{n=1}^{N} x(n)x^H(n) \quad (14)$$

which can be rewritten according to the matrix notation of (13):

$$R = APA^H + \sigma^2 I \quad (15)$$

where P is the source covariance matrix and I is the identity matrix.

Not surprisingly, since R reflects the (spatial) spectrum of the received signal and the directions of arrival are obviously linked with the peaks of the spectrum, most of the DOA estimation techniques make use of the spectral information contained in R.

The simplest; DOA estimation technique (also called conventional DOA estimation) merely amounts to finding the peaks of the spatial spectrum:

$$P_{BF} = \frac{a^H(\theta) R a(\theta)}{L^2} \quad (16)$$

i.e. the maximum output power when the beam is steered over the angular range. However, this method suffers from severe resolution limitation when a plurality of sources are present.

Numerous DOA estimation techniques have been designed in the prior art and no purpose would be served here by reciting them all. A review of these techniques can be found in the article of H. Krim and M. Viberg entitled "Two decades of array signal processing research" published in IEEE Signal Processing Magazine, July 1996, pp. 67–74.

The most popular DOA estimation techniques are MUSIC (MUltiple SIgnal Classification) and ESPRIT (Estimation of Signal Parameters via Rotational Invariance Techniques) as well as various techniques derived therefrom.

The MUSIC algorithm relies on an eigenanalysis of the spatial covariance matrix R. The array reponse vectors $a(\theta)$ define an Hilbertian space of dimension L which can be decomposed into a signal sub-space of dimension M and a noise sub-space of dimension L–M (it is assumed that M<L). R is a hermitian, positive semi-definite matrix of rank M (the M sources are supposed uncorrelated and therefore P is full rank). The eigenvalues of R can be ranked: $\lambda_1 \geq \lambda_2 \geq \ldots > \lambda_{M+1} = \ldots = \lambda_L = \tau^2$ where the first M eigenvalues correspond to eigenvectors spanning the signal sub-space and the last L–M eigenvalues correspond to eigenvectors spanning the noise subspace. Denoting:

$$\Pi^\perp = I - A(A^H A)^{-1} A^H \quad (17)$$

the projection operator onto the noise sub-space, the directions of arrival are determined by finding the peaks in the so-called MUSIC spectrum:

$$P_M(\theta) = \frac{a^H(\theta) a(\theta)}{a^H(\theta) \Pi^\perp a(\theta)} \quad (18)$$

Various improvements of the MUSIC algorithm have been proposed in the litterature in order to overcome some shortcomings in specific measurement conditions.

The ESPRIT algorithm exploits the rotational invariance of the signal sub-space when the antenna array is invariant by translation (e.g. a ULA). A detailed description of the algorithm can be found in the article of R. Roy et al. entitled "ESPRIT: Estimation of Signal Parameters via Rotational Invariance Techniques" published in IEEE Transactions on ASSP, Vol. 37, No. 7, July 1989, pp. 984–995. Here again, the algorithm relies on an eigendecomposition of the array covariance matrix R leading to a decomposition into a signal sub-space and a noise subspace.

Furthermore, the DOA estimation methods based on signal and noise sub-space decomposition, e.g. MUSIC or ESPRIT, requires the knowledge of the number M of signal sources. This number may be obtained from the multiplicity of the eigenvalue $\sigma^2$ in the covariance matrix. In most cases, however, the value $\sigma^2$ is unknown and M is derived from the number of "most equal" eigenvalues which is also called the MDL (Minimum Description Length) criterion.

The above mentioned algorithms use the covariance matrix R. In practice, of course, this matrix is not avaible and must be estimated e.g. by expression (14). The noise level on the coefficients of the estimate of the covariance matrix may lead to an erroneous determination of the DOAs and/or number of signal sources.

SUMMARY OF THE INVENTION

It is an object of the invention to reduce the noise level on the estimate of the covariance matrix so as to improve the DOA and/or number of sources estimation especially for low signal-to-noise ratios (SNRs).

This problem is solved by the method defined in appended claim 1 i.e. by a method for estimating a direction of arrival of a signal transmitted by a signal source and received by an antenna array, said method estimating the covariance matrix of the signals respectively received by the antennas of the array and deriving therefrom a direction of arrival, wherein said received signals are correlated with a reference signal transmitted by said source prior to be submitted to the covariance matrix estimation.

BRIEF DESCRIPTION OF THE DRAWINGS

Various embodiments of the invention are defined in the dependent claims.

The invention will be better understood from a description of the various embodiments of the invention in relation with the following figures.

DESCRIPTION OF THE PREFERRED EMBODIMENTS

Broadly speaking, the idea behind the invention is to use reference signals transmitted by the sources in order to reduce the noise level in the coefficients of the estimate of the covariance matrix. The signals received by the antennas are first correlated with the reference signals transmitted by the sources before being intercorrelated. As it will be shown hereafter, this preprocessing step significantly improves the SNR and consequently the DOA estimation.

For the sake of clarity the invention will be presented in the context of a DS-CDMA (Direct Spread-Code Division Multiple Access) system, although it can virtually be applied to any system in which sources transmit reference signals.

We consider first the case where only one source is located in the far field of an antenna array. For example, this antenna array will be located at a base station of a DS-CDMA mobile communication system and the signal source will be the terminal of a user. In general, the signal transmitted by the terminal propagates along different paths before impinging onto the antenna array. The array receives several replica of the signal each arriving in a given direction and after a given delay. The paths corresponding to the same delay will be referred to as synchronous paths whereas paths with different delays will be called asynchronous paths. We consider the case where M synchronous paths originate from the source and impinge onto the array under M angles of incidence. This assumption can be regarded equivalent to having M coherent sources in M distinct directions.

The signals received by the L antennas of the array are sampled at the chip frequency. They may be used as such or despread by the user code. Of course, if the signals are despread, the samples are available at the symbol rate. The same formalism applies for both cases: the sampled received signals can be arranged in a matrix X:

$$X = A\Gamma S + N \tag{19}$$

where $X=[x(1),x(2),\ldots,x(N)]$ and $x(i)$ is the vector of the received signals sampled at time $iT$ where $1/T$ is the chip rate and $iT_s$ (where if the received signals are despread.

$$S = \begin{bmatrix} s_1^T \\ s_2^T \\ \vdots \\ s_M^T \end{bmatrix} = \begin{bmatrix} s^T \\ s^T \\ \vdots \\ s^T \end{bmatrix} \text{ where } s = [s(1), s(2), \ldots, s(N)]^T$$

$$\Gamma = \begin{bmatrix} \alpha_1 & 0 & \cdots & 0 \\ 0 & \alpha_2 & \ddots & \vdots \\ \vdots & \ddots & \ddots & 0 \\ 0 & \cdots & 0 & \alpha_M \end{bmatrix} \text{ where } \alpha_1, \alpha_2, \ldots, \alpha_M \text{ represent the}$$

complex gains of each synchronous path;

$N=[n(1),n(2),\ldots,n(N)]$ where $n(i)$ is the vector of the noise signals sampled at time i. We suppose now that the source transmits a reference signal s i.e. in the context of DS-CDMA a sequence of pilot symbols. The preprocessing step is given by:

$$y = \frac{1}{N} X s^* = A\Gamma S s^* + N s^* \tag{20}$$

It should be noted that if the received signals are not despread by the user code the columns of X exhibit redundancy. Conversely, if the received signals are despread by the user code, the correlation expressed in (20) is performed over a series of N symbols.

Without loss of generality, we assume that $s(n)s^*(n)=1$. We consider the case M=2 to simplify notations. It can be easily shown that:

$$y = \begin{bmatrix} y_1 \\ y_2 \\ \vdots \\ y_L \end{bmatrix} = \begin{bmatrix} \alpha_1 + \alpha_2 + \frac{1}{N}\sum_{n=1}^{N} n_1(n)s^*(n) \\ \alpha_1 \exp(j\pi\cos\theta_1) + \alpha_2 \exp(j\pi\cos\theta_2) + \frac{1}{N}\sum_{n=1}^{N} n_2(n)s^*(n) \\ \vdots \\ \alpha_1 \exp(j(L-1)\pi\cos\theta_1) + \alpha_2 \exp(j(L-1)\pi\cos\theta_2) + \frac{1}{N}\sum_{n=1}^{N} n_L(n)s^*(n) \end{bmatrix} \tag{21}$$

The noise on each antenna after preprocessing can be expressed as:

$$n'_l = \frac{1}{N}\sum_{n=1}^{N} n_l(n)s^*(n) \quad l = 1, \ldots, L \tag{22}$$

It is a white Gaussian complex noise with zero mean and variance $\sigma^2/N$ i.e. $n_1 \sim N(0,\sigma^2/N)$. By using y instead of X in the estimation of R, we will show that we obtain a reduction of the noise level, in particular for the diagonal elements. We recall the expressions of the estimates of the spatial covariance matrix respectively without and with the preprocessing step:

$$R = \frac{1}{N}\sum_{n=1}^{N} x(n)x^H(n) \qquad (23)$$

$$R_P = yy^H \qquad (24)$$

If we consider the diagonal elements, we may restrict our comparison without loss of generality to the element of the first row and first column of the matrix:

$$\frac{1}{N}\sum_{n=1}^{N} x_1(n)x_1^*(n) = |\alpha_1 + \alpha_2|^2 + \qquad (25)$$

$$2\text{Re}\left\{\frac{\alpha_1 + \alpha_2}{N} \frac{1}{N}\sum_{n=1}^{N} s(n)n_1^*(n)\right\} + \frac{1}{N}\sum_{n=1}^{N} |n_1(n)|^2$$

$$y_1 y_1^* = |\alpha_1 + \alpha_2|^2 + 2\text{Re}\left\{\frac{\alpha_1 + \alpha_2}{N} \frac{1}{N}\sum_{n=1}^{N} s(n)n_1^*(n)\right\} + \qquad (26)$$

$$\left(\frac{1}{N}\sum_{n=1}^{N} n_1(n)s^*(n)\right)\left(\frac{1}{N}\sum_{n=1}^{N} n_1^*(n)s(n)\right)$$

The expressions are identical except for the last terms. The second terms in the expressions (25) and (26) are Gaussian random variables with zero mean and variance $\sigma^2/N$.

The noise elements $n_1(n)$ are white Gaussian complex random variables, the real part and the imaginary part of which having zero mean and variance $\sigma_D^2 = \sigma^2/2$, i.e. $n_1(n) = n_{1R}(n) + jn_{1I}(n)$, with $n_{1R}(n) \sim N(0,\sigma_D^2)$, $n_{1I}(n) \sim N(0,\sigma_D^2)$, ..., N. The noise after preprocessing, $n'_1$, is also a white Gaussian complex random variable, the real part and the imaginary part of which having zero mean and variance $\sigma_D^2/N$ i.e. $n'_1 = n'_{1R} + j.n'_{1I}$, with $n'_{1R} \sim N(0,\sigma_D^2/N)$, $n'_{1I} \sim N(0,\sigma_D^2/N)$.

Thus, if we denote Y and Y' the last terms of expressions (25) and (26) respectively, we have:

$$Y = \frac{1}{N}\sum_{n=1}^{N}[(n_{1R}(n))^2 + (n_{1I}(n))^2] \qquad (27)$$

$$Y' = (n'_{1R})^2 + (n'_{1I})^2 \qquad (28)$$

In order to simplify notations, we introduce the independent random variables $X_i \sim N(0,\sigma_D^2)$, $i=1,\ldots,2N$ and $X'_j \sim N(0,\sigma_D^2/N)$, $j=1,2$. We can rewrite the expressions (27) and (28):

$$Y = \frac{1}{N}\sum_{i=1}^{2N}(X_i)^2 \qquad (29)$$

$$Y' = \sum_{j=1}^{2}(X'_j)^2 \qquad (30)$$

It can be shown that Y and Y' are central chi-square distributed random variables with respectively 2N and 2 degrees of freedom. The first two moments of a central chi-square-distributed random variable $$E[Y] = 2\sigma_D^2 \text{ and } \sigma_Y^2 = \frac{4\sigma_D^4}{N} \qquad (31)$$

$$E[Y'] = \frac{2\sigma_D^2}{N} \text{ and } \sigma_{Y'}^2 = \frac{4\sigma_D^4}{N^2} \qquad (32)$$

with n degrees of freedom, each $Z_i$ being independent and identically distributed Gaussian random variables with zero mean and variance $\sigma^2$, are $E[Z] = n\sigma^2$ and $E[Z^2] = 2n\sigma^4 + n^2\sigma^4$. From the values of these moments we can derive the means as well as the variances $\sigma_Y^2$ and $\sigma_{Y'}^2$ of Y and Y' respectively:

$$Z = \sum_{i=1}^{n} Z_i^2$$

The mean value of the noise corrupting the diagonal elements has therefore been reduced by a factor N. Similarly, as far as the variance is concerned, the contribution of the last term in (26) is N times smaller than the contribution of the last term in (25). Therefore by using a pilot-aided estimation of the covariance matrix instead of the blind estimation of the prior art, we have removed the bias on the diagonal elements and reduced the noise variance on the both diagonal and off-diagonal elements. Furtheremore, it is important to note that the estimation of the number of paths according to the MDL criterion benefits also from the reduction of noise level since it is also based on the estimate of the covariance matrix.

Let us now consider the case where more than one source, e.g. two sources $S_1$ and $S_2$ are present in the far field and where the signal propagation between each of the sources and the array involves only one propagation path. This assumption is equivalent to having two incoherent sources in two distinct directions.

The output of the preprocessing step for the source $S_1$ can be written, similar to (21):

$$y_1 = \begin{bmatrix} \alpha_1 + \frac{\alpha_2}{N}\sum_{n=1}^{N} s_2(n)s_1^*(n) + n'_1 \\ \alpha_1 \exp(j\pi\cos\theta_1) + \left(\frac{\alpha_2}{N}\sum_{n=1}^{N} s_2(n)s_1^*(n)\right)\exp(j\pi\cos\theta_2) + n'_2 \\ \vdots \\ \alpha_1 \exp(j(L-1)\pi\cos\theta_1) + \left(\frac{\alpha_2}{N}\sum_{n=1}^{N} s_2(n)s_1^*(n)\right)\exp(j(L-1)\pi\cos\theta_2) + n'_L \end{bmatrix} \qquad (33)$$

where $s_1(n)$ and $s_2(n)$, $n=1, \ldots, N$ are pilot sequences transmitted by $S_1$ and $S_2$ respectively and $$n'_1 = \frac{1}{N}\sum_{n=1}^{N} n_l(n)s_1^*(n),$$

$l=1, \ldots, L$. The calculation of $R_p^{-1} = y_l y_1^H$ gives therefore a spatial spectral density $|\alpha_1|^2$ in the direction $\theta_1$ and $$\theta_1 \text{ and } \frac{|\alpha_2|^2}{N^2}\left|\sum_{n=1}^{N} s_2(n)s_1^*(n)\right|^2$$

in the direction $\theta_2$. The peak in the direction $\theta_2$ is therefore reduced by a factor proportional to the cross-correlation between the two sequences (the pilot sequences are ideally orthogonal). The preprocessing step prior to the covariance matrix estimation leads here again to a more accurate determination of the number of paths and their respective angles of incidence.

Figure 2:
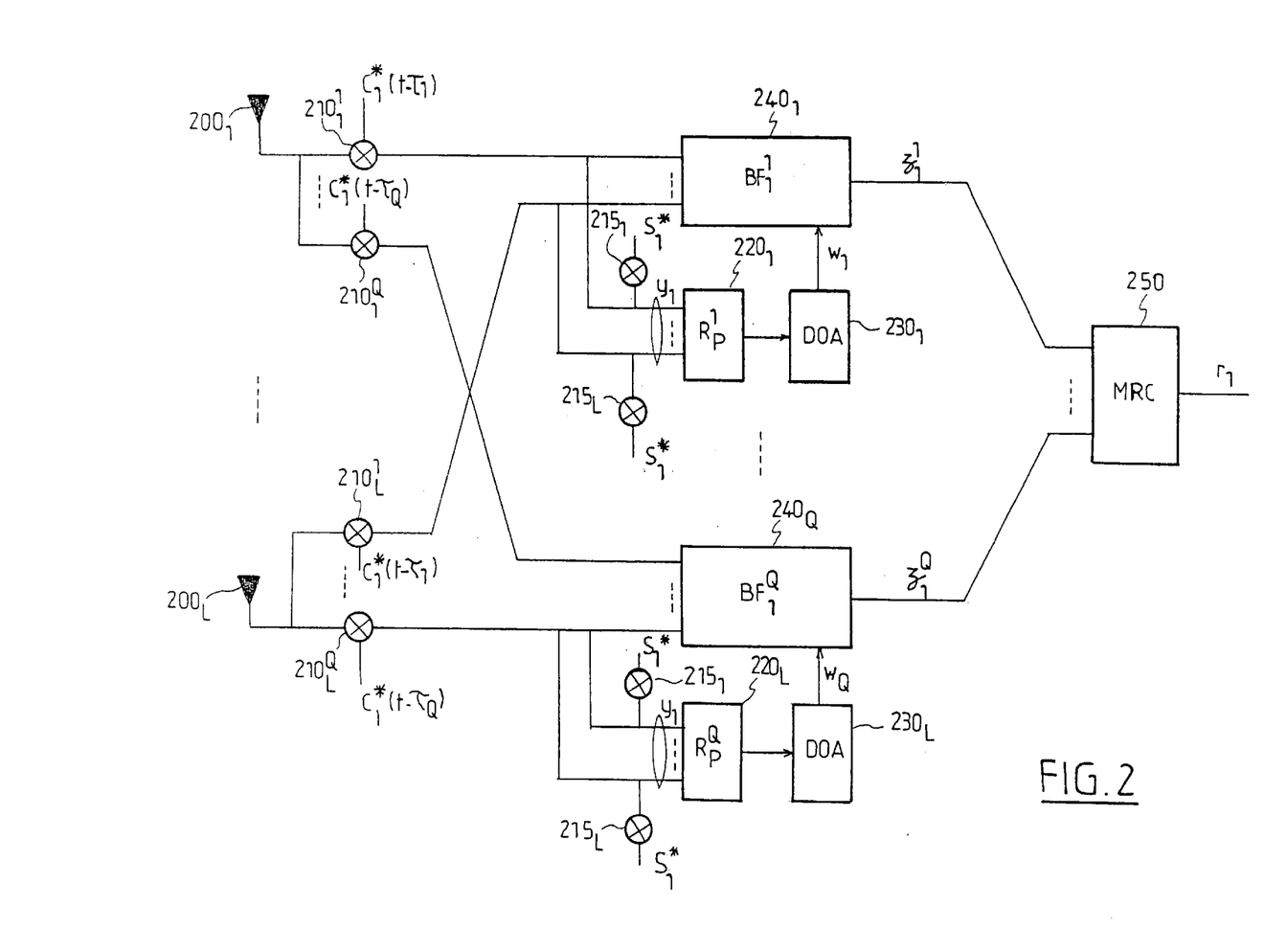
FIG. 2 schematically shows a DS-CDMA receiver using a DOA estimation according to a first embodiment of the invention.

FIG. 2 shows a DS-CDMA receiver using the pilot-aided DOA estimation according to the invention. The receiver comprises an array of antennas $200_1, \ldots, 200_L$ receiving the signals transmitted by a plurality M of users. For the sake of clarity, only the sub-sytem of the receiver relative to user #1 has been illustrated. It should be clear that in fact M such sub-sytems operate in parallel in the receiver.

Each received signal is despread with the user #1 spreading code $c_1$. More precisely, the signal received by antenna $200_l$ is correlated in the correlators $210_l^1, \ldots 210_l^Q$ with delayed versions of the spreading codes aligned with the times of arrival $\tau_1, \ldots, \tau_Q$ given by a delay profile analyzer (not shown). A plurality of beamformers $240_1, \ldots, 240_Q$ are provided, each beamformer $240_q$ $q=1, \ldots, Q$ receiving a set of L despread signals corresponding to a plurality $m_q$ of synchronous paths. For example, $240_1$ inputs despread signals having propagated along synchronous paths all arriving at time $\tau_1$ and forms $m_1$ beams in the respective directions of these paths. The received signals are correlated in $215_0, \ldots, 215_L$ with a sequence of pilot symbols $s_1(n)$ of user #1 (in despread form). An estimate $R_p^1$ of the covariance matrix is obtained in $220_1$ from the vector of correlated signals $y_1$. The matrix $R_p^1$ is then used by a DOA estimator $230_1$ implementing one of the DOA estimation algorithms reviewed above e.g. one of the conventional, Capon, MUSIC or ESPRIT algorithms. A complex vector $w_1$ of weighting coefficients is obtained from the estimated DOAs and transmitted to beamformer $240_1$. The vector $w_1$ achieves a beamforming in the $m_1$ directions of the synchronous paths. The output signals $z_1^q$ of the beamformers $240_q$, $q=1, \ldots, Q$ are then MRC (Maximum Ratio Combining) combined in $250_1$ to give an estimate $r_1$ of the signal transmitted by user #1.

Figure 3:
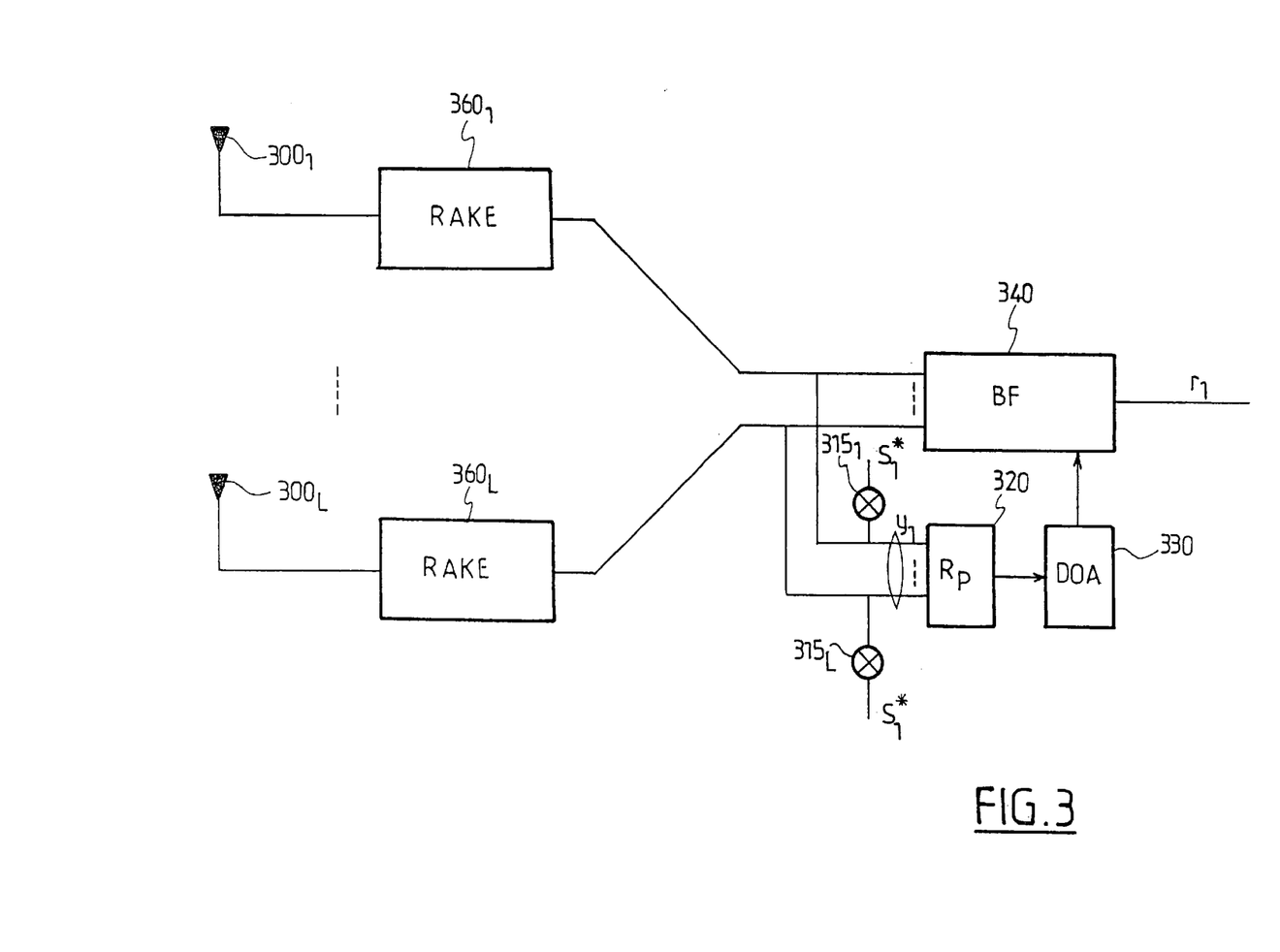
FIG. 3 schematically shows a DS-CDMA receiver using a DOA estimation according to a second embodiment of the invention.

Alternately, in a second embodiment of the invention illustrated in FIG. 3, the different paths originating from a user are combined in a RAKE receiver before being subjected to beamforming. In this embodiment only one beamformer (instead of Q) is needed per user. Here again, FIG. 3 shows only the sub-sytem of the receiver relative to user #1. It should be clear that in fact M such sub-sytems operate in parallel in the receiver. The RAKE receivers $360_1, \ldots, 360_L$ input the signals respectively received by the antennas $300_1, \ldots, 300_L$ and combine the paths originating from user #1. The signals output from the RAKE receivers are then correlated in $315_0, \ldots, 315_L$ with a sequence of pilot symbols $s_1(n)$ of user #1 (in despread form). An estimate $R_P$ of the covariance matrix is obtained in $320_1$ from the vector of correlated signals $y_1$. The DOAs are then estimated in $330$ from $R_P$ and the vector of weighting coefficients is transmitted to the beamformer $340$.

Figure 4:
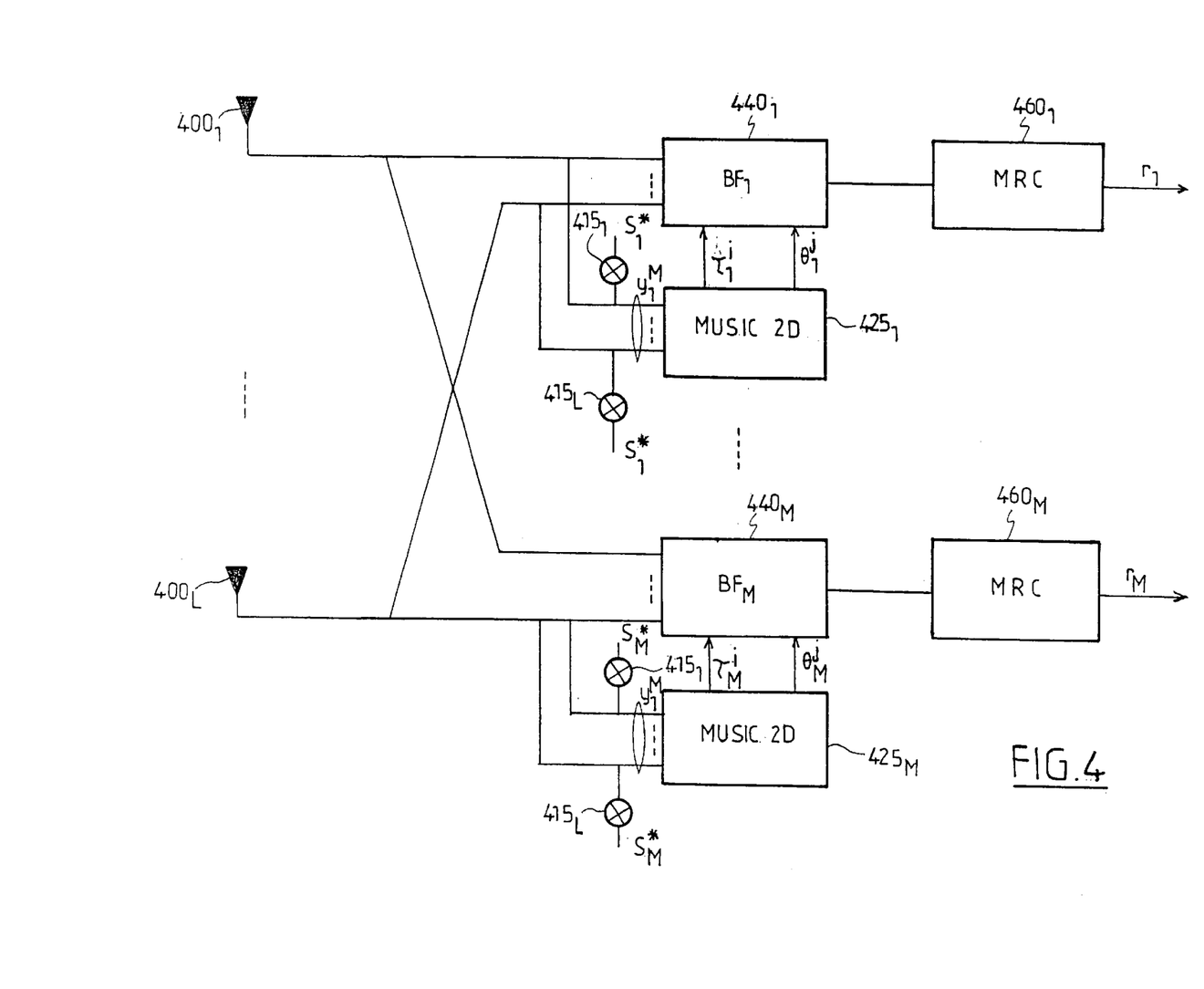
FIG. 4 schematically shows a DS-CDMA receiver using a DOA estimation according to a third embodiment of the invention.

In a third embodiment, illustrated in FIG. 4, the beamforming is realized before despreading (i.e. at the chip rate). In this embodiment only one beamformer is needed per user. Since it operates wide-band, it uses delays as well as DOAs. The beamformers $440_1, \ldots, 440_M$ are provided for the users #1, ..., #M respectively. For a given user #j, a set of correlators $415_1, \ldots, 415_L$ perform the correlation of the received signals with the pilot sequence (in spread form) of said user. More precisely, this correlation is performed at different frequencies (within the spectral band) of the received signals and the pilot sequence signal. For each user #j=#1, ..., #M, the results of the correlation are exploited in block $425_j$ by a MUSIC 2D algorithm, kown as such, which gives the delays and DOAs for the paths originating from user #j. The different paths are then combined in an MRC combiner $460_j$ to provide an estimate $r_1$ of the signal transmitted by user #1.

Although the invention has been essentially described within the context of DS-CDMA, it should be understood that it can be applied to any passive beamforming system when sources to be located transmit reference signals.

What is claimed is:

1. Method for estimating a direction of arrival of an arrival signal transmitted by a signal source and received by an antenna array, comprising:
   estimating a covariance matrix of plural signals respectively received by antennas of the antenna array and deriving therefrom a direction of arrival;
   correlating the received plural signals with a reference signal transmitted by the signal source prior to the received plural signals being submitted to the covariance matrix estimating.

2. Method according to claim 1, wherein the direction of arrival is obtained from the estimating of the covariance matrix by carrying out a MUSIC type algorithm.

3. Method according to claim 1, wherein the direction of arrival is obtained from the estimating of the covariance matrix by carrying out an ESPRIT type algorithm.

4. Method according to claim 1, wherein the arrival signal transmitted by the signal source propagates to the antenna array along a plurality of propagation paths, the received plural signals are grouped into sets of synchronously received signals, the received plural signals of each set being correlated with the reference signal transmitted by the signal source prior to the received plural signals being submitted to the covariance matrix estimating.

5. Method according to claim 1, wherein the arrival signal transmitted by the signal source is DS-CDMA coded with a spreading code, the plural received signals are first despread, and the despread signals are then correlated with a sequence of pilot symbols prior to the despread signals being submitted to the covariance matrix estimating.

6. Method according to claim 5, wherein the despread signals are weighted by weighting coefficients and added to form a beam in a beamforming operation, a vector of weighting coefficients being derived from the estimating of the covariance matrix.

7. Method according to claim 6, wherein a plurality of beamforming operations are performed for a plurality of synchronous received signals, and respective outputs of the beamforming operations are MRC combined.

8. Method according to claim 1, wherein the arrival signal transmitted by the signal source is DS-CDMA coded with a spreading code, the plural received signals are first despread and combined in a same plurality of RAKE receivers, signals respectively output from the RAKE receivers being each correlated with a sequence of pilot symbols prior to the plural signals output from the RAKE receivers being submitted to covariance matrix estimating.

9. Method according to claim 8, wherein the signals output from the RAKE receivers are weighted by weighting coefficients and added to form a beam in a beamforming operation, a vector of weighting coefficients being derived from the estimating of the covariance matrix.

10. Method according to claim 1, wherein the arrival signal transmitted by the signal source is DS-CDMA coded by a spreading code, the plural received signals are each correlated with spread pilot symbols before being subjected to a MUSIC 2D estimation.

11. Method according to claim 10, wherein the plural received signals are subjected to a beamforming operation using delays and directions of arrival output by the MUSIC 2D estimation.

12. Method according to claim 11, wherein the signals output from the beamforming operator for the directions of arrival are MRC combined.

* * * * *